No. 843,213. PATENTED FEB. 5, 1907.
O. H. JUVE.
WIRE REEL.
APPLICATION FILED JUNE 22, 1906.
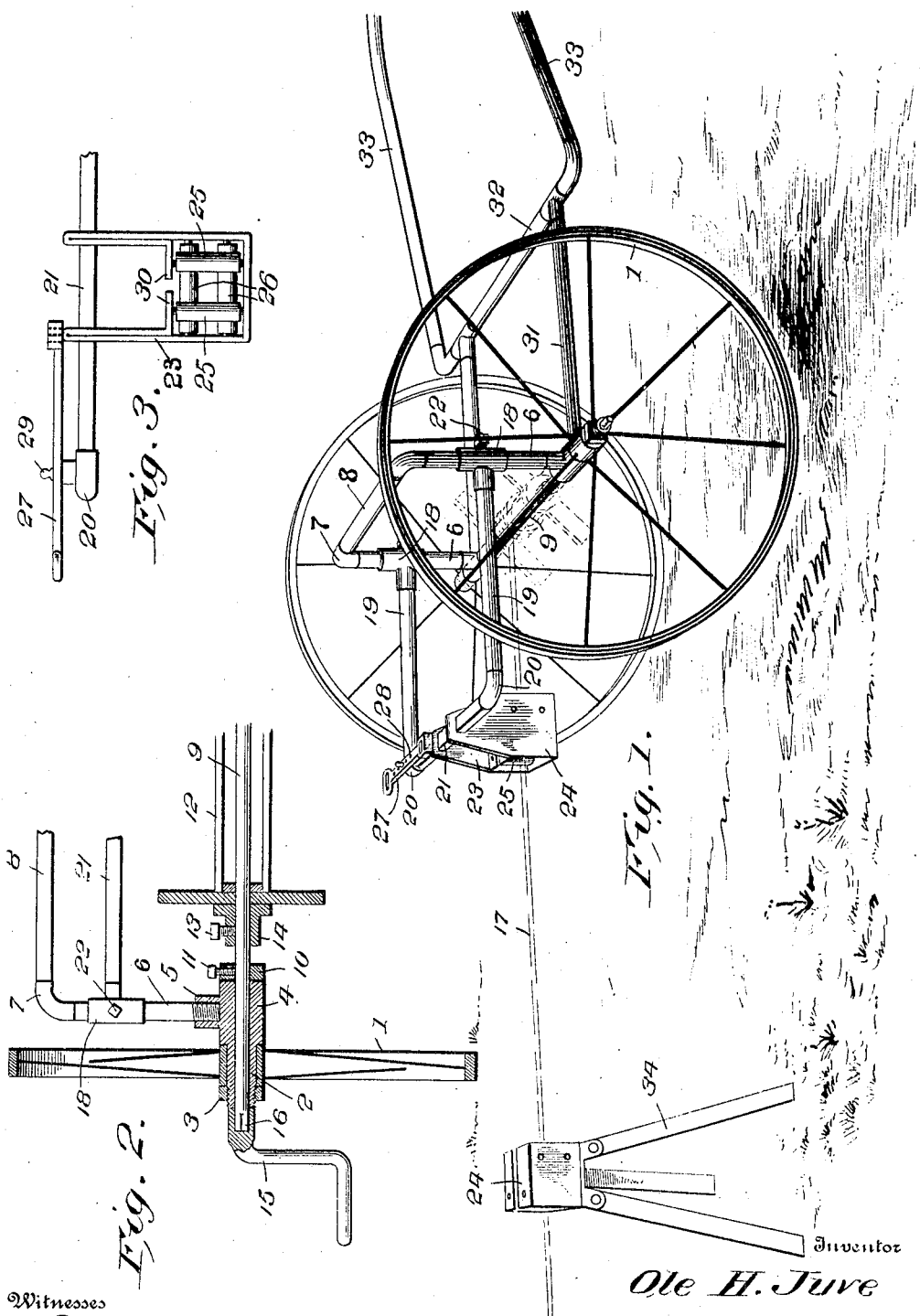
Witnesses
Inventor
Ole H. Juve
By W. J. Fitzgerald & Co
Attorneys

UNITED STATES PATENT OFFICE.

OLE H. JUVE, OF DECORAH, IOWA.

WIRE-REEL.

No. 843,213.      Specification of Letters Patent.      Patented Feb. 5, 1907.

Application filed June 22, 1906. Serial No. 322,957.

*To all whom it may concern:*

Be it known that I, OLE H. JUVE, a citizen of the United States, residing at Decorah, in the county of Winneshiek and State of Iowa, have invented certain new and useful Improvements in Wire-Reels; and I do hereby declare the following to be a full, clear, and exact description of the invention, such as will enable others skilled in the art to which it appertains to make and use the same.

My invention relates to new and useful improvements in reels, and more particularly to that class adapted to be used in handling fence-wire or the like; and my object is to provide means for taking up strands of wire along the line of fence and disposing them upon the reel.

A further object is to provide suitable means for guiding the wire upon the reel, whereby said wire will be evenly disposed from end to end of the reel.

A still further object is to provide a suitable truck for transporting the reel from point to point.

Other objects and advantages will be hereinafter referred to, and more particularly pointed out in the claims.

In the accompanying drawings, which are made a part of this application, Figure 1 is a perspective view of my improved reel operatively mounted upon a suitable truck. Fig. 2 is a detail sectional view of a portion of the reel and truck, and Fig. 3 is an elevation of one of the wire-guides and a portion of the supporting-arm therefor.

Referring to the drawings, in which similar reference-numerals designate corresponding parts throughout the several views, 1 indicates carrying-wheels, said wheels being rotatably mounted upon suitable hollow spindles 2, the outer ends of said spindles being threaded to receive suitable taps 3, by which means the wheels are secured upon spindles, the inner ends of said spindles being provided with heads 4, said heads forming shoulders against which the wheels bear.

Tubular sockets 5 are formed integral with the heads 4, into which take the lower ends of standards 6, the upper ends of the standards being provided with elbows 7, to which are secured a cross-bar 8, the standards 6, elbows 7, and cross-bar 8 forming a suitable frame, by which means the spindles 2 are held in relation with one another.

The shaft 9 is disposed through the tubular spindles 2 and is held in position therein by means of collars 10, said collars being secured to the shaft by means of set-screws 11 and in juxtaposition to the inner ends of spindles 2, thereby holding the shaft against longitudinal movement.

The shaft 9 is disposed loosely in the spindles 2, so that it will turn independently thereof, and has located thereon at a point between the spindles 2 a suitable reel 12, said reel being held rigid with the shaft 9 by means of a set-screw 13 passing through the hub 14 of the reel and into engagement with the shaft.

When desired, rotation is applied to the reel 12 by inserting a suitable crank 15 onto the squared end 16 of the shaft 9, so that when said crank is manually rotated the wire 17 will be disposed upon the reel 12.

In disposing the wire upon the reel it is necessary that the wire be distributed evenly over the full length of the reel, and to this end I have mounted upon the standards 6 T-heads 18, to the stem of which are secured horizontally-disposed parallel arms 19, each of said arms having an elbow 20 at its outer end in which is disposed a bar 21, said bar being preferably substantially square in cross-section. The T-heads and parts carried thereby are slidably mounted upon the standards 6 and are adjustably secured thereto by means of binding-bolts 22. The bar 21 is adapted to receive the ears 23 of the guide-box 24, said guide-box having mounted therein a pair of vertically-disposed rollers 25 and a pair of horizontally-disposed rollers 26, said rollers serving as guides for the wire 17, whereby said wire may be properly disposed upon the reel 12.

The guide-box is longitudinally adjustable on the bar 21 and is controlled by means of a lever 27, said lever being secured in any preferred manner to one of the ears 23 and is preferably disposed parallel with the bar 21, a plurality of openings 28 being provided in said lever, through which takes a locking-pin 29, said pin extending through lever 27 and into one of the elbows 20, thereby providing means whereby after the guide-box 24 has been properly adjusted upon the bar 21 the locking-pin 29 may be inserted through one of the openings 28 in the lever and into engagement with the elbows 20, thereby securing the guide-box in its adjusted position.

The guide-box 24 is preferably composed of one continuous piece of metal, the side piece thereof being extended upwardly to form the ears 23, the free ends 30 thereof being disposed in a horizontal position in which the upper ends of the rollers 25 find bearings, thereby enabling me to produce a very cheap form of guide.

Extending forwardly from the tubular spindles 2 are arms 31, said arms having secured upon their outer ends a cross-arm 32, to which is secured a pair of shafts 33 and by which means a draft-animal may be employed in transporting the reel from place to place.

After the reel 12 has been filled with wire and it is desired to remove the reel from off the shaft 9 the set-screws 11 and 13 are loosened, when the shaft 9 may be moved longitudinally through the spindles 2 and reel 12 until the shaft is entirely free of the reel, after which an empty reel may be placed in position and the shaft inserted therethrough and secured in place in the spindles 2, the reel being rigidly secured to the shaft 9 by the set-screw 13, so that when power is applied to the shaft through the medium of the crank 15 said reel will be rotated and the wire disposed thereon.

This form of device may be also employed in disposing strands of wire along the line of fence, and when so employed a reel of wire is placed upon the shaft 9 and one end of the wire secured to any stationary object, after which the draft-animal may be driven forward and the wire disposed from off the reel.

In order to more readily dispose the wire upon the reel and prevent the same from dragging upon the ground and catching upon obstructions, I dispose at intervals along the path of the wire a plurality of guide-boxes 24, said boxes being constructed similar to the guide-boxes upon the bar 21, except that the ears 23 are dispensed with and said boxes supported upon legs or the like 34, said legs being preferably disposed in the form of a tripod. It will thus be seen that the wire will be elevated a short distance from the ground and prevented from catching upon obstructions.

It will now be seen that I have provided a very durable and light construction from the fact that the parts forming the frame of my device are preferably constructed of tubular sections, such as gas-pipe or the like.

What I claim is—

1. A reel of the class described comprising the combination with a suitable frame, tubular spindles on said frame, supporting-wheels for said spindles; of a shaft rotatably disposed in said spindles, a reel on said shaft, a guide member for said reel and means to adjustably secure said guide member to the frame.

2. A reel of the class described comprising a frame formed of tubular section, tubular spindles secured to the depending portion of said frame, carrying-wheels on said spindles, a shaft rotatably mounted in said spindles and adapted to project from each edge thereof, a reel on said shaft and between said spindles and a guide member on said frame and means to adjust said guide member.

3. A reel of the class described comprising a tubular frame, tubular spindles on the depending portions of said frame, a shaft rotatably mounted within and removable from said spindles, a reel on said shaft, arms adjustably mounted upon said frame and a bar disposed between the outer ends of said arms and a guide-box adjustably mounted upon said bar.

4. A reel of the class described comprising a tubular frame, supporting-axles for said frame, parallel arms extending at right angles to the vertical portion of said frame, a T-head for each of said arms, means to adjustably secure said T-heads to the frame and a bar disposed between the outer ends of said arms, said bar being designed to carry a guide-box.

In testimony whereof I have signed my name to this specification in the presence of two subscribing witnesses.

OLE H. JUVE.

Witnesses:
 JOHN J. AKRE,
 A. E. THUNE.